(12) United States Patent
Sun

(10) Patent No.: US 10,927,808 B2
(45) Date of Patent: Feb. 23, 2021

(54) SPIRAL BLADE HAVING WIND GUIDE

(71) Applicant: Sang Kyu Sun, Seoul (KR)

(72) Inventor: Sang Kyu Sun, Seoul (KR)

( * ) Notice: Subject to any disclaimer, the term of this patent is extended or adjusted under 35 U.S.C. 154(b) by 438 days.

(21) Appl. No.: 15/528,716

(22) PCT Filed: Nov. 26, 2015

(86) PCT No.: PCT/KR2015/012758
§ 371 (c)(1),
(2) Date: May 22, 2017

(87) PCT Pub. No.: WO2016/085264
PCT Pub. Date: Jun. 2, 2016

(65) Prior Publication Data
US 2017/0260963 A1    Sep. 14, 2017

(30) Foreign Application Priority Data
Nov. 26, 2014    (KR) .......................... 10-2014-0166101

(51) Int. Cl.
*F03D 1/06*        (2006.01)
*F03D 1/02*        (2006.01)
(Continued)

(52) U.S. Cl.
CPC ........... *F03D 1/0625* (2013.01); *F03D 1/025* (2013.01); *F03D 1/04* (2013.01); *F03D 1/0633* (2013.01); *F03D 9/25* (2016.05); *Y02E 10/72* (2013.01)

(58) Field of Classification Search
CPC .......... F03D 1/025; F03D 1/04; F03D 1/0608; F03D 1/0658; F03D 1/0691; F03D 9/25
(Continued)

(56) References Cited

U.S. PATENT DOCUMENTS 651,504 A * 6/1900 Griffin .................... B64C 11/48
                                                        416/128
1,031,629 A * 7/1912 De Los Rios .................. 415/72
(Continued)

FOREIGN PATENT DOCUMENTS

KR    10-2011-0071071 A    6/2011
KR      10-1052132 B1      7/2011
(Continued)

OTHER PUBLICATIONS

International Search Report dated Feb. 22, 2016, issued in International Application No. PCT/KR2015/012758.

*Primary Examiner* — Brian P Wolcott
*Assistant Examiner* — Aye S Htay
(74) *Attorney, Agent, or Firm* — Harness, Dickey & Pierce, P.L.C.

(57) ABSTRACT

A wind control blade (31) of a wind guide (30) of the present invention forms a 20° wind control blade lateral curved surface gradient angle (32), a 30° wind control blade longitudinal spiral twist angle (33), a 180° wing control blade alignment angle (34), and a 15° wind control blade rear gradient angle (35). In addition, a turbine blade (41) forms a 30° turbine blade lateral curved surface gradient angle (42), a 40° turbine blade longitudinal spiral twist angle (43), and a 120° turbine blade alignment angle (44). The 20° wind control blade lateral curved surface gradient angle (32) and the 30° wind control blade longitudinal spiral twist angle (33) of the wind control blade (31) have more gradual and wider incidence angles than the 30° turbine blade lateral curved surface gradient angle (42) and the 40° turbine blade longitudinal spiral twist angle (43) of the turbine blade (41). Accordingly, since more wind enters into the central direction of the inner side of the turbine blade (41) and a primary (Continued)

whirlwind is generated, much higher acceleration can be obtained.

4 Claims, 6 Drawing Sheets

(51) Int. Cl.
  *F03D 1/04* (2006.01)
  *F03D 9/25* (2016.01)
(58) Field of Classification Search
  USPC .......................................................... 415/4.3
  See application file for complete search history.

(56) References Cited

U.S. PATENT DOCUMENTS

| | | | | |
|---|---|---|---|---|
| 1,090,956 | A * | 3/1914 | Zinteck | 416/176 |
| 1,461,502 | A * | 7/1923 | Solinger | F03B 17/061 |
| | | | | 416/123 |
| 3,318,388 | A * | 5/1967 | Bihlmire | B63H 1/20 |
| | | | | 416/134 R |
| 4,522,600 | A * | 6/1985 | Jost | F03D 1/0633 |
| | | | | 440/8 |
| 4,842,483 | A * | 6/1989 | Geary | B63H 23/34 |
| | | | | 416/93 A |
| 5,368,438 | A * | 11/1994 | Raible | F04D 29/2277 |
| | | | | 415/143 |
| 6,773,232 | B2 * | 8/2004 | Powers | B63H 23/34 |
| | | | | 416/134 R |
| 7,241,105 | B1 * | 7/2007 | Vanderhye | B63H 13/00 |
| | | | | 415/4.2 |
| 7,600,963 | B2 * | 10/2009 | Miller | F03B 17/061 |
| | | | | 415/4.3 |
| 7,806,661 | B2 * | 10/2010 | Duffield | B63H 1/14 |
| | | | | 416/176 |
| 7,938,622 | B2 * | 5/2011 | Anderson, Jr. | F03B 13/264 |
| | | | | 416/6 |
| 7,948,110 | B2 * | 5/2011 | Morgan | F03D 3/005 |
| | | | | 290/44 |
| 8,002,516 | B2 * | 8/2011 | Rashidi | F03D 13/20 |
| | | | | 415/4.3 |
| 8,152,464 | B2 * | 4/2012 | Anderson, Jr. | F03B 3/126 |
| | | | | 415/4.3 |
| 8,272,838 | B2 * | 9/2012 | Takeuchi | F04D 29/2261 |
| | | | | 416/144 |
| 8,282,352 | B2 * | 10/2012 | Anderson, Jr. | F03B 17/061 |
| | | | | 415/4.3 |
| 8,786,123 | B2 * | 7/2014 | Bannister | F03D 3/002 |
| | | | | 290/55 |
| 2008/0246284 | A1 * | 10/2008 | Pelman | F03D 3/005 |
| | | | | 290/55 |
| 2010/0278650 | A1 * | 11/2010 | Parker | F03D 1/0633 |
| | | | | 416/176 |
| 2011/0081243 | A1 * | 4/2011 | Sullivan | F03D 3/002 |
| | | | | 416/120 |
| 2011/0254276 | A1 * | 10/2011 | Anderson, Jr. | F03B 17/061 |
| | | | | 290/54 |

FOREIGN PATENT DOCUMENTS

| | | |
|---|---|---|
| KR | 10-1073897 B1 | 10/2011 |
| KR | 10-2014-0054496 A | 5/2014 |
| KR | 20-2014-0003891 U | 6/2014 |

* cited by examiner

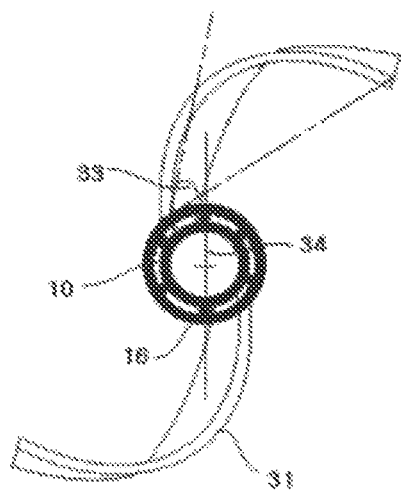
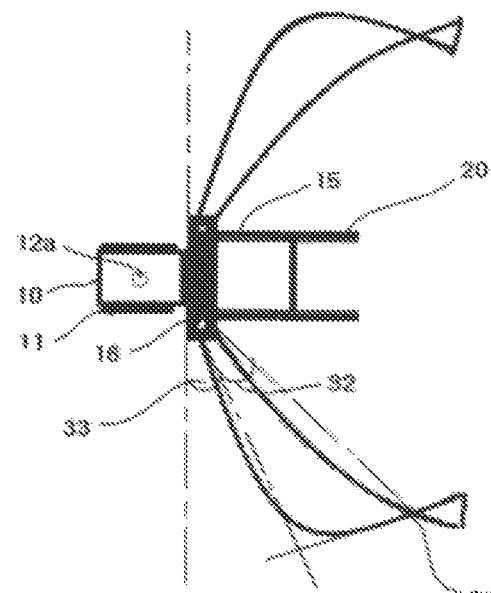
FRONT SURFACE OF WIND GUIDE IN CLOCKWISE DIRECTION
SIDE SURFACE OF WIND GUIDE IN CLOCKWISE DIRECTION
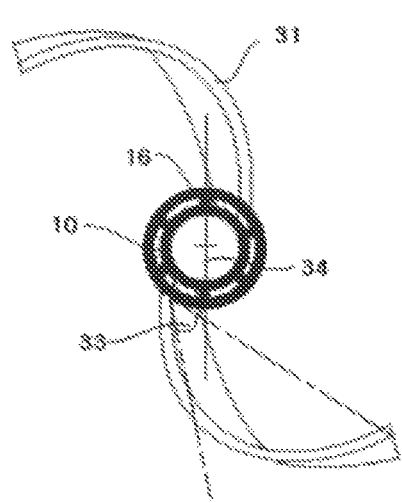
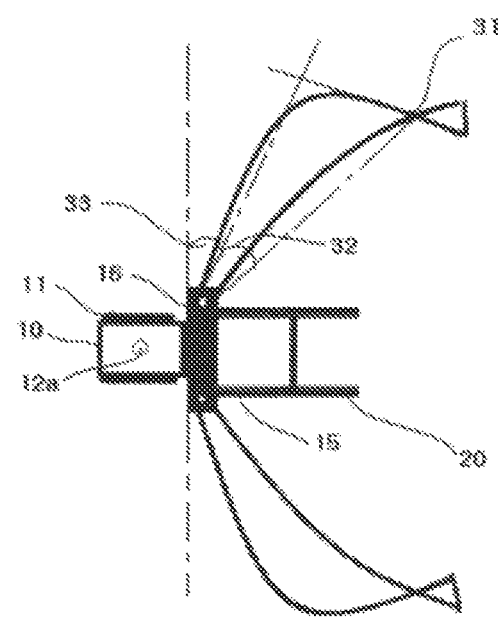
FRONT SURFACE OF WIND GUIDE IN COUNTER CLOCKWISE-DIRECTION
SIDE SURFACE OF WIND GUIDE IN COUNTER-CLOCKWISE DIRECTION
FIG. 3

SPIRAL BLADE HAVING WIND GUIDE

CROSS REFERENCE TO RELATED APPLICATIONS

This application is a U.S. National Stage of International Application No. PCT/KR2015/012758, filed Nov. 26, 2015, which claims the benefit of Korean patent Application No. 10-2014-0166101, filed Nov. 26, 2014, the entire contents and disclosures of which are incorporated herein by reference.

TECHNICAL FIELD

The present invention relates to a spiral blade having a horizontal-axis wind guide for a wind power turbine, and more particularly, to obtaining a rotational force from a wind using a horizontal-axis wind power turbine.

BACKGROUND ART

Most of the currently used horizontal-axis wind power turbines aim at using characteristics of winds most efficiently.

Such a wind power turbine generator has a structure of transmitting a rotational force of a rotor installed in parallel with a wind direction to a power generation device via a gear device and a speed change device. Extra-large structures require high manufacturing and assembling costs and have low economic feasibility, and in particular, propeller rotary bodies have low air volume integration effects and thus have a high loss rate of winds, and also, have a serious problem of environmental destruction due to damage to nature and noises.

FIG. 6 is a perspective view showing a horizontal-axis wind power turbine generator of a new structure and a driving method thereof, according to the related art.

Referring to FIG. 6, like the structure of the normal horizontal-axis wind power generator, the horizontal-axis wind power turbine generator includes a nacelle 1 rotating according to a direction of a wind, a turbine blade 3, a rotor shaft 5, and a generator top 2 fixed to the ground. Unlike the related-art horizontal-axis wind power generator having a speed change device and a power generation device mounted therein, the nacelle 1 includes: a vertical bevel gear 4 coupled to one end of the rotor shaft 5 so as to receive a rotational force from the turbine blade 3; a first horizontal bevel gear 6 fitted into one end of the vertical bevel gear 4 to receive the rotational force; a vertical shaft 7 coupled to the first horizontal bevel gear 6 to receive the rotational force; a second horizontal bevel gear 8 which has an inner hole through which the vertical shaft 7 penetrates, and is fitted into the other end of the vertical bevel gear 4 to receive the rotational force; and a hollow shaft 9 which has an inner hole formed therein in a longitudinal direction to allow the vertical shaft 7 to penetrate therethrough, and is coupled to the second horizontal bevel gear 8 to receive the rotational force. Therefore, the horizontal-axis wind power turbine generator has a concentric double axis structure and is configured to independently transmit a rotational force to two or more power generation turbine units in the lower generator top 2.

Referring to the horizontal-axis wind power turbine generator having the above-described structure and the driving process of the driving method thereof, a rotation turbine having combined double blades is utilized in order to use winds more efficiently due to the structure of the wind power turbine generator. However, air turbulence may be formed due to interference of an air flow between the front rotor and the rear rotor and may rather reduce the speed of winds. In addition, a ratio between the gears and the rotary shafts of the generator internally connected with each other may be unstable and thus efficiency may be reduced. The turbine rotor, the speed change device, and the power generation device are mounted in a structure, known as the nacelle 1, and thus the nacelle 1 and the turbine blade are rotated together according to the direction of winds. The related-art horizontal-axis wind power turbine generator having all power generation devices integrated into the nacelle 1 and driven with the nacelle 1 has many problems that are difficult to solve due to its special space-intensive structure.

Therefore, in the related-art propeller type wind power generator, the blade is less likely to receive winds by itself and thus a utilization rate thereof is low and also, the blade cannot avoid the resistance of the wind behind the blade and thus the rotation speed is low. Therefore, the overall performance is low.

DETAILED DESCRIPTION OF THE PRESENT DISCLOSURE

Technical Objects

The present invention has been developed in order to solve the above-described problems of the prior art. An object of the present invention is to provide a wind guide and a spiral blade forming a twist in a longitudinal direction, and provide a horizontal-axis wind power turbine unit using a plug, a socket, and a hollow cylinder pipe.

Technical Solving Means

The present invention, as the technical idea to achieve the above-described object, includes: a wind guide 30 coupled to the front side of a wind power turbine unit 500 forming a main body; and a spiral blade 40 coupled to the rear side of the wind guide 30.

A wind control blade 31 forms a 20° wind control blade lateral curved surface gradient angle 32, a 30° wind control blade longitudinal spiral twist angle 33, a 180° wind control blade alignment angle 34, and a 15° wind control blade rear gradient angle 35, and a turbine blade 41 forms a 30° turbine blade lateral curved surface gradient angle 42, a 40° turbine blade longitudinal spiral twist angle 43, and a 120° turbine blade alignment angle 44 to be coupled to each other by connecting by means of a hollow cylinder pipe 15, a plug, and a socket.

Effect of the Invention

A wind control blade 31 of a wind guide 30 of the present invention forms a 20° wind control blade lateral curved surface gradient angle 32, a 30° wind control blade longitudinal spiral twist angle 33, a 180° wind control blade alignment angle 34, and a 15° wind control blade rear gradient angle 35. In addition, a turbine blade 41 forms a 30° turbine blade lateral curved surface gradient angle 42, a 40° turbine blade longitudinal spiral twist angle 43, and a 120° turbine blade alignment angle 44. The 20° wind control blade lateral curved surface gradient angle 32 and the 30° wind control blade longitudinal spiral twist angle 33 of the wind control blade 31 have more gradual and wider incidence angles than the 30° turbine blade lateral curved surface gradient angle 42 and the 40° turbine blade longitudinal spiral twist angle 43 of the turbine blade 41. Accordingly, since more wind enters into the central direction of the inner side of the turbine blade 41 and a primary whirlwind is generated, much higher acceleration can be obtained.

In addition, a second spiral blade 40 having the same size and shape as the spiral blade 40 and coupled to the rear side of the spiral blade 40 in series increases the capacity of the wind power turbine unit 500 two times without causing temporal and economical burdens, such that a wind pressure can be maintained for a long time. In addition, a rotational force can be increased by reducing a frictional resistance of air behind the spiral blade 40 without interfering with the flow of a fluid.

BRIEF DESCRIPTION OF DRAWINGS

FIG. 3 illustrates a front view and a side view showing a wind guide;

BEST MODE FOR EMBODYING THE INVENTION

Figure 1:
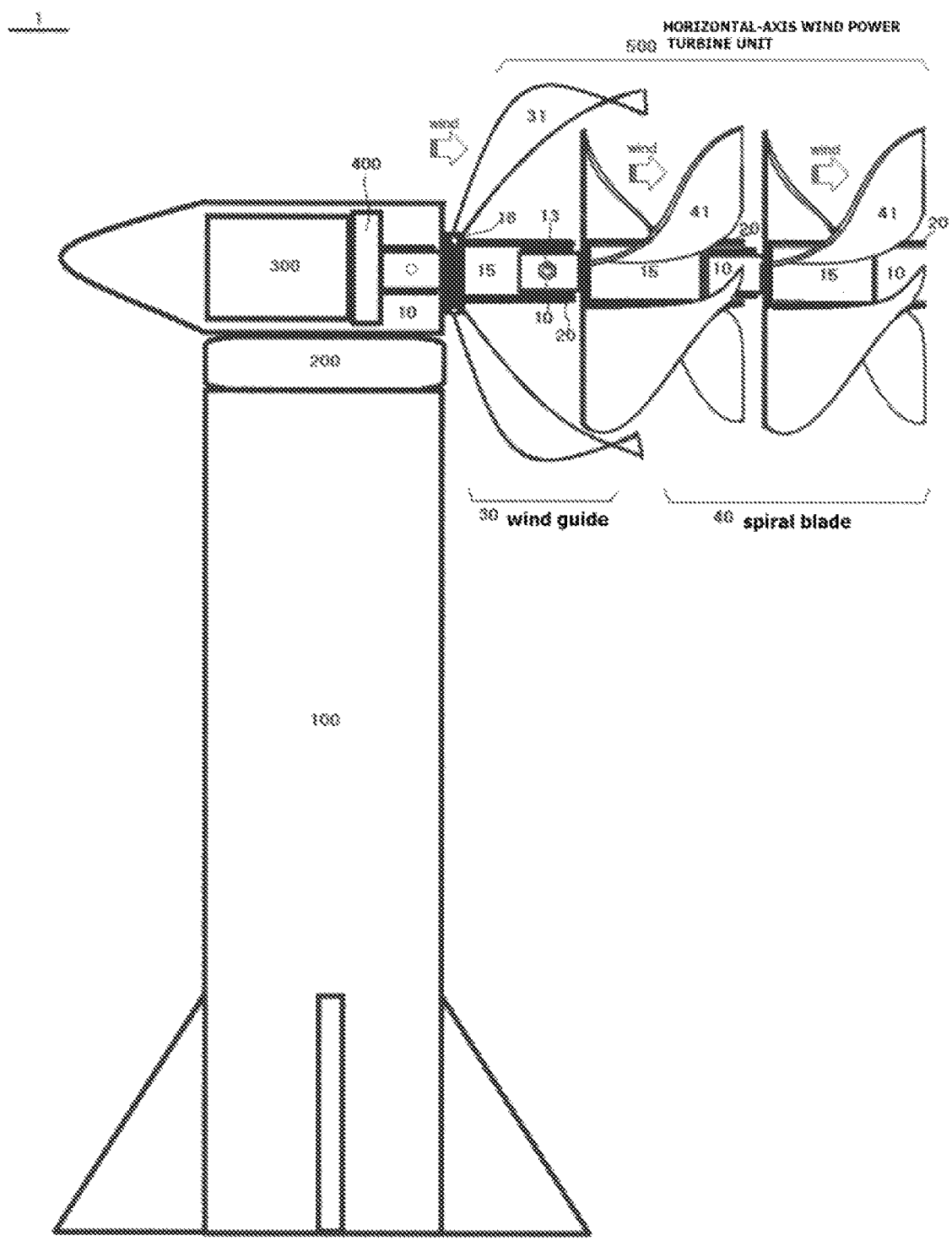
FIG. 1 illustrates a plane view showing a configuration of a horizontal-axis wind power turbine device according to the present invention.

A horizontal-axis wind power turbine device 1 for producing power includes:

a ground structure 100 serving as a support on the ground;

a yawing device 200 turning from side to side on the top of the ground structure 100;

a nacelle 450 connecting a power generator 300 and an accelerator 400, and a unit bearing 16 on the top of the yawing device 200;

a wind power turbine unit 500 for producing power energy;

a plug 10 having a hollow formed therein and formed in a cylindrical shape;

a hollow cylinder pipe 15 having a hollow formed therein and formed in a cylindrical shape;

a socket 20 having a hollow formed therein and formed in a cylindrical shape to allow the plug 10 to be inserted thereinto;

a wind guide 30 which is provided with a plurality of wind control blades 31 formed by bending plate structures in a streamlined shape in a leftward or rightward direction, and which forms a 20° wind control blade lateral curved surface gradient angle 32, a 30° wind control blade longitudinal spiral twist angle 33, a 180° wind control blade alignment angle 34, and a 15° wind control blade rear gradient angle 35 due to the shape of the wind control blade 31, the plug 10 and the socket 20 being mounted into the front side and the rear side of the hollow cylinder pipe 15, respectively; and a spiral blade 40 which is provided with a plurality of identical turbine blades 41 formed by bending plate structures in a spiral pattern in a leftward or rightward direction, the turbine blades 41 being attached to the outer circumference of the hollow cylinder pipe 15, the plug 10 and the socket 20 being mounted in the front side and the rear side of the hollow cylinder pipe 15, respectively.

MODES FOR EMBODYING THE INVENTION

Hereinafter, preferred embodiments of the present invention will be described in detail with reference to the accompanying drawings.

A wind power turbine is normally comprised of blades. The wind power turbine includes various blades to allow more winds to enter from the outside and is configured to obtain efficient power using a wind control plate.

The present invention is to study a horizontal-axis wind power turbine device 1 which is capable of producing power by enhancing an integration effect of an air volume and a wind pressure using a wind guide 30 and a spiral blade 40.

FIG. 1 is a plane view showing a configuration of a horizontal-axis wind power turbine device according to the present invention.

Referring to FIG. 1, a wind power turbine unit 500 according to the present invention is provided with a yawing device 200 which is supported on the ground by a ground structure 100 and turns from side to side on the top of the ground structure 100, and a nacelle 450 is installed on the yawing device to connect a power generator 300 and an accelerator 400 to a unit bearing 16 and to be coupled to the wind power turbine unit 500 for producing power energy.

More specifically, the wind power turbine unit 500 is divided into a wind guide 30 and a spiral blade 40. The wind guide 30 has a hollow cylinder pipe 15 formed in the center thereof as a base, and has a plug 10 coupled to a front surface thereof and a socket 20 coupled to a rear surface thereof. The outer circumference of the hollow cylinder pipe 15 is coupled to the inner circumference of the unit bearing 16 coupled to the right side surface of the nacelle 450, and the hollow cylinder pipe 15 serves as a rotary shaft to transmit power behind the hollow cylinder pipe 15 to the accelerator 300.

A wind control blade 31 is coupled to the outer circumference of the unit bearing 16 perpendicularly to the clockwise direction or counter clockwise direction, and the wind control blade 31 does not rotate and just guides winds, and the front plug 10 of the wind guide 30 is coupled to one side of the accelerator 300.

The rear socket 20 of the wind guide 30 is coupled to a front plug 10 of the spiral blade 40.

The spiral blade 40 has a hollow cylinder pipe 15 formed in the center thereof as a base, and has a plug 10 coupled to a front surface thereof and a socket 20 coupled to a rear surface thereof, and three turbine blades 41 are coupled to the outer circumference of the hollow cylinder pipe 15 in the clockwise direction or counter clock wise direction.

Each of the wind guide 30 and the spiral blade 40 has a plurality of concavo-convex protrusions 11 protruding from the outer circumference of the plug 10 coupled to the front surface thereof at a predetermined angle, and has a plurality of protrusion connection recesses 21 formed on the inner circumference of the socket 20 coupled to the rear surface thereof at a predetermined angle. Using the plurality of concavo-convex protrusions 11 and the plurality of protrusion connection recesses 21, the plug 10 and the socket 20 are coupled to each other in series like Lego block stacking by adjusting an insertion angle, and are fastened to each other by means of a screw 13 through screwing holes 12a, 12b formed on the bodies of the plug and the socket. In this way, the wind guide 30 is coupled with as many spiral blades 40 as intended, for example, two or more spiral blades 40.

As a result, the wind control blade 31 of the wind guide 30 that does not rotate refracts winds blowing from the front side, and the turbine blades 41 of the spiral blade 40 that are ready to rotate collect and collide with the wind, such that the spiral blade 40 can obtain a more powerful rotational force. The obtained rotational force drives the power generator 300 through the accelerator 400, such that power is produced.

Figure 2:
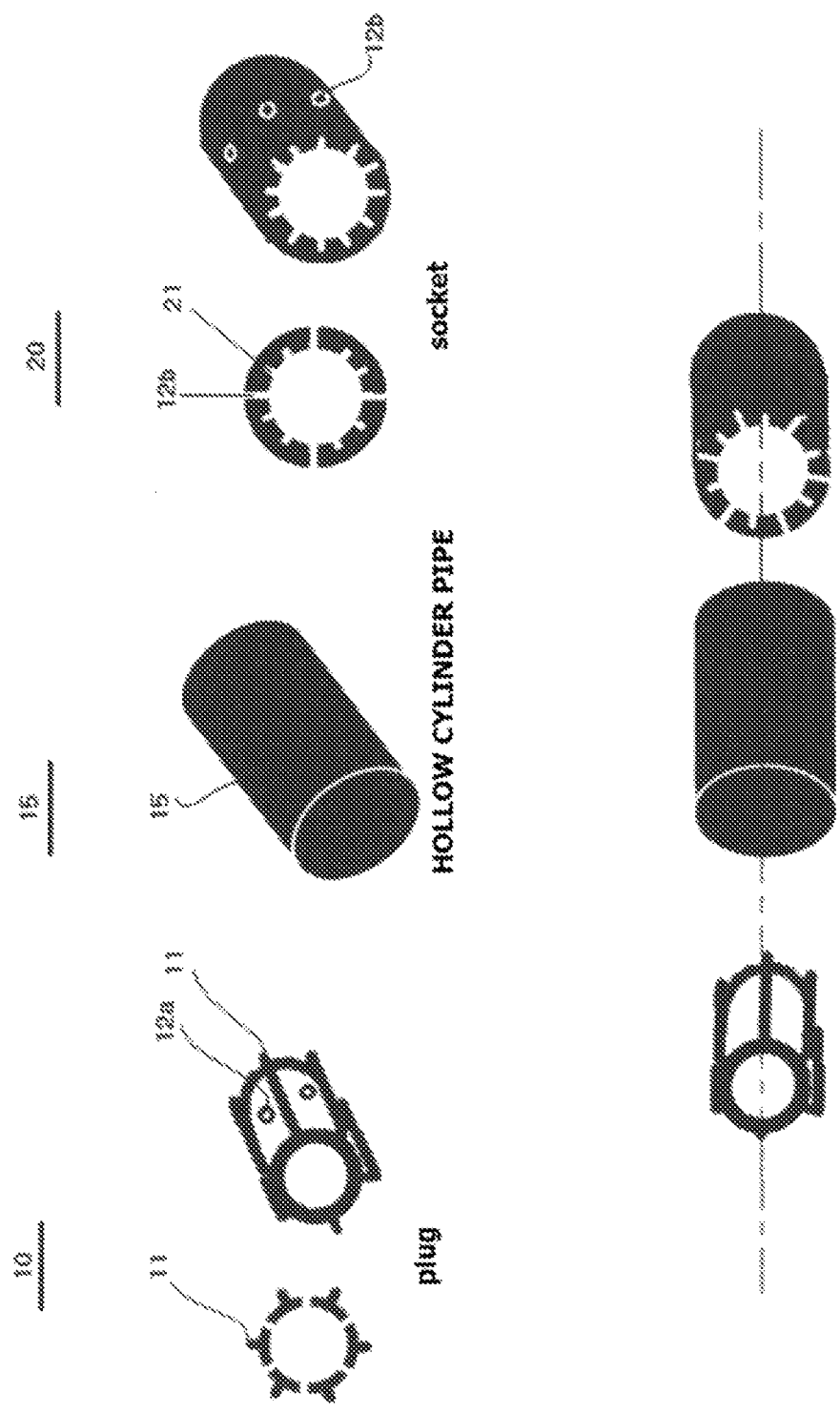
FIG. 2 illustrates a front view and a perspective view showing a plug and a socket.

FIG. 2 illustrates a front view and a perspective view showing the plug and the socket.

Referring to FIG. 2, the plug 10 has a hollow cylindrical shape and has the plurality of concavo-convex protrusions 11 formed on the outer circumference thereof at the predetermined angle, and the socket 20 has a hollow cylindrical shape and has the plurality of protrusion connection recesses 21 formed on the inner circumference thereof at a predetermined angle and more than the concavo-convex protrusions 11 to be coupled with the plug 10.

The plug 10 and the socket 20 are mounted into the front side and the rear side of the hollow cylinder pipe 15, respectively, and the hollow cylinder pipe 15 having the plug 10 and the socket 20 mounted therein functions as a shaft of the wind guide 30 and the spiral blade 40.

The plug 10 and the socket 20 have the screwing holes 12a, 12b formed on the bodies thereof so as to be mutually coupled to each other.

FIG. 3 illustrates a front view and a side view showing the wind guide. Referring to FIG. 3, the wind control blade 31 of the wind guide 30 forms a 20° wind control blade lateral curved surface gradient angle 32, a 30° wind control blade longitudinal spiral twist angle 33, a 180° wind control blade alignment angle 34, and a 15° wind control blade rear gradient angle 35 by bending two plate structures in a streamlined shape in the clockwise direction or counter clockwise direction.

More specifically, the 20° wind control blade lateral curved surface gradient angle 32 of the wind control blade 31 is formed by forming the gradient of the curved surface in the streamlined shape from 0° to 20°.

The 30° wind control blade longitudinal spiral twist angle 33 of the wind control blade 31 is formed by forming the wind control blade 31 in a spiral pattern, ranging from 0° to 30°, from a start point to an end point in the longitudinal direction.

The 180° wind control blade alignment angle 34 of the wind control blade 31 is formed in the clockwise direction or counter clockwise direction by maintaining 180° between one side ends of the wind control blades 31 on the outer circumference of the unit bearing 16 in the vertical direction.

The 15° wind control blade rear gradient angle 35 of the wind control blade 31 is formed by inclining the wind control blade 31 by 15° in a backward direction from a perpendicular line to the outer circumference of the hollow cylinder pipe 15 to an outermost point of the wind control blade 31.

The wind guide 30 has the hollow cylinder pipe 15 formed in the center thereof as a base, and has the plug 10 coupled to the front surface thereof and the socket 20 coupled to the rear surface thereof. The outer circumference of the hollow cylinder pipe 15 is coupled to the inner circumference of the unit bearing 16 coupled to the right side surface of the nacelle 450, and the hollow cylinder pipe 15 serves as a rotary shaft to transmit power behind the hollow cylinder pipe 15 to the accelerator 300.

Two wind control blades 31 are coupled to the outer circumference of the unit bearing 16 in a perpendicular direction. The wind control blades 31 do not rotate and just guide winds, and the front plug 10 of the wind guide 30 is coupled to one side of the accelerator 300.

The rear socket 20 of the wind guide 30 is coupled to the front plug 10 of the spiral blade 40.

Figure 4:
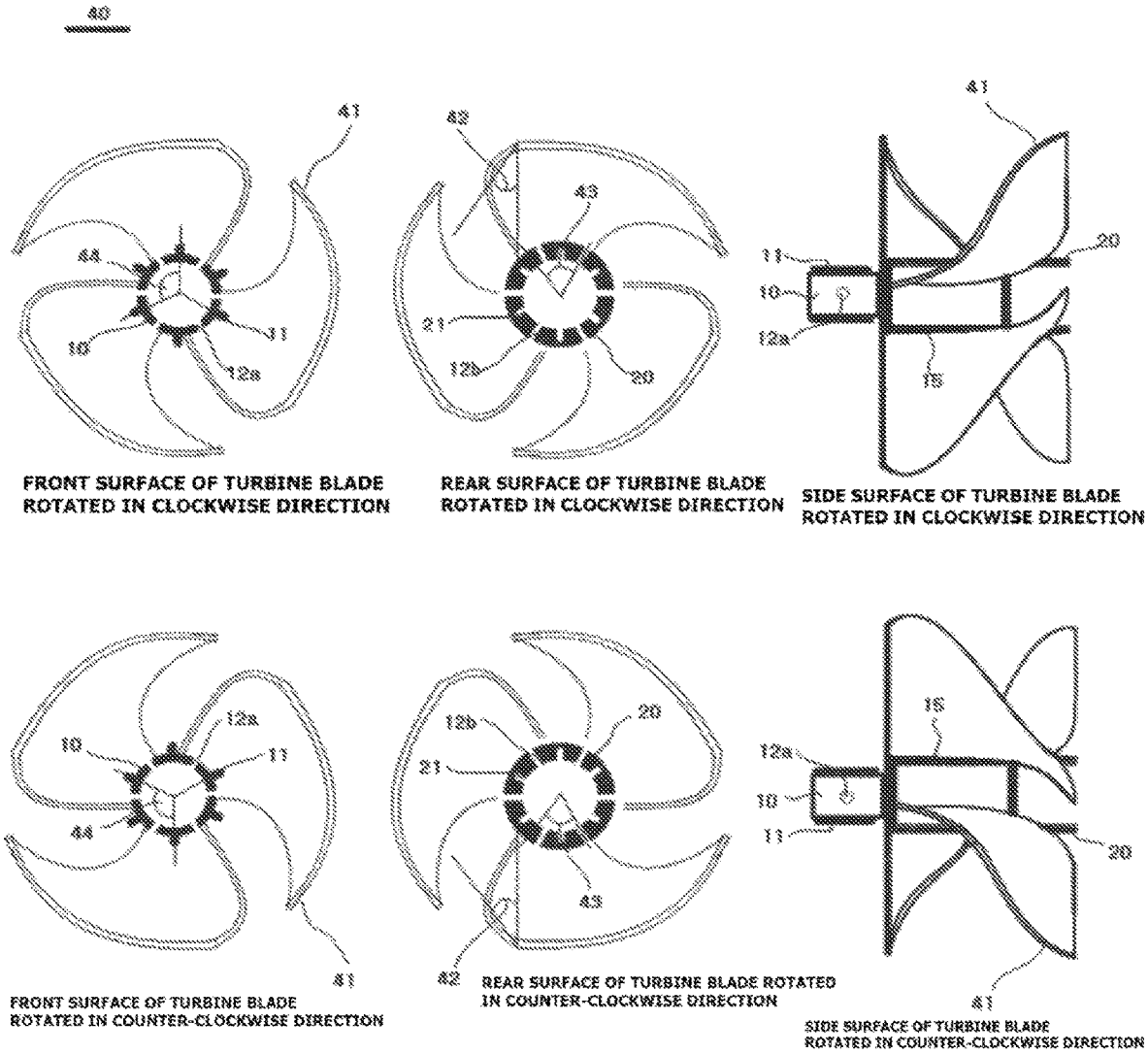
FIG. 4 illustrates a front view, a rear view, and a side view showing a spiral blade.

FIG. 4 illustrates a front view, a rear view, and a side view showing the spiral blade.

Referring to FIG. 4, the turbine blade 41 of the spiral blade 40 forms a 30° turbine blade lateral curved surface gradient angle 42, a 40° turbine blade longitudinal spiral twist angle 43, and a 120° turbine blade alignment angle 44 by bending three plate structures in a spiral pattern.

More specifically, the 30° turbine blade lateral curved surface gradient angle 42 of the turbine blade 41 is formed by forming the gradient of the curved surface in the streamlined shape from 0° to 30°.

The 40° turbine blade longitudinal spiral twist angle 43 of the turbine blade 41 is formed by forming the turbine blade 41 in a spiral pattern, ranging from 0° to 40°, from a start point to an end point in the longitudinal direction.

Three 120° turbine blade alignment angles 44 of the turbine blades 41 are formed by maintaining 120° between one side ends of the turbine blades 41 on the outer circumference of the hollow cylinder pipe 15.

The spiral blade 40 has the hollow cylinder pipe 15 formed in the center thereof as a base, and has the plug 10 coupled to the front surface thereof and the socket 20 coupled to the rear surface thereof, and three turbine blades 41 are coupled to the outer circumference of the hollow cylinder pipe 15 in the clockwise direction or counter clockwise direction.

Each of the wind guide 30 and the spiral blade 40 has the plurality of concavo-convex protrusions 11 protruding from the outer circumference of the plug 10 coupled to the front surface thereof at the predetermined angle, and has the plurality of protrusion connection recesses 21 formed on the inner circumference of the socket 20 coupled to the rear surface thereof at the predetermined angle. Using the plurality of concavo-convex protrusions 11 and the plurality of protrusion connection recesses 21, the plug 10 and the socket 20 are coupled to each other in series like Lego block stacking by adjusting an insertion angle, and are fastened to each other by means of the screw 13 through the screwing holes 12a, 12b formed on the bodies of the plug and the socket. In this way, the wind guide 30 is coupled with as many spiral blades 40 as intended, for example, two or more spiral blades 40.

Figure 5:
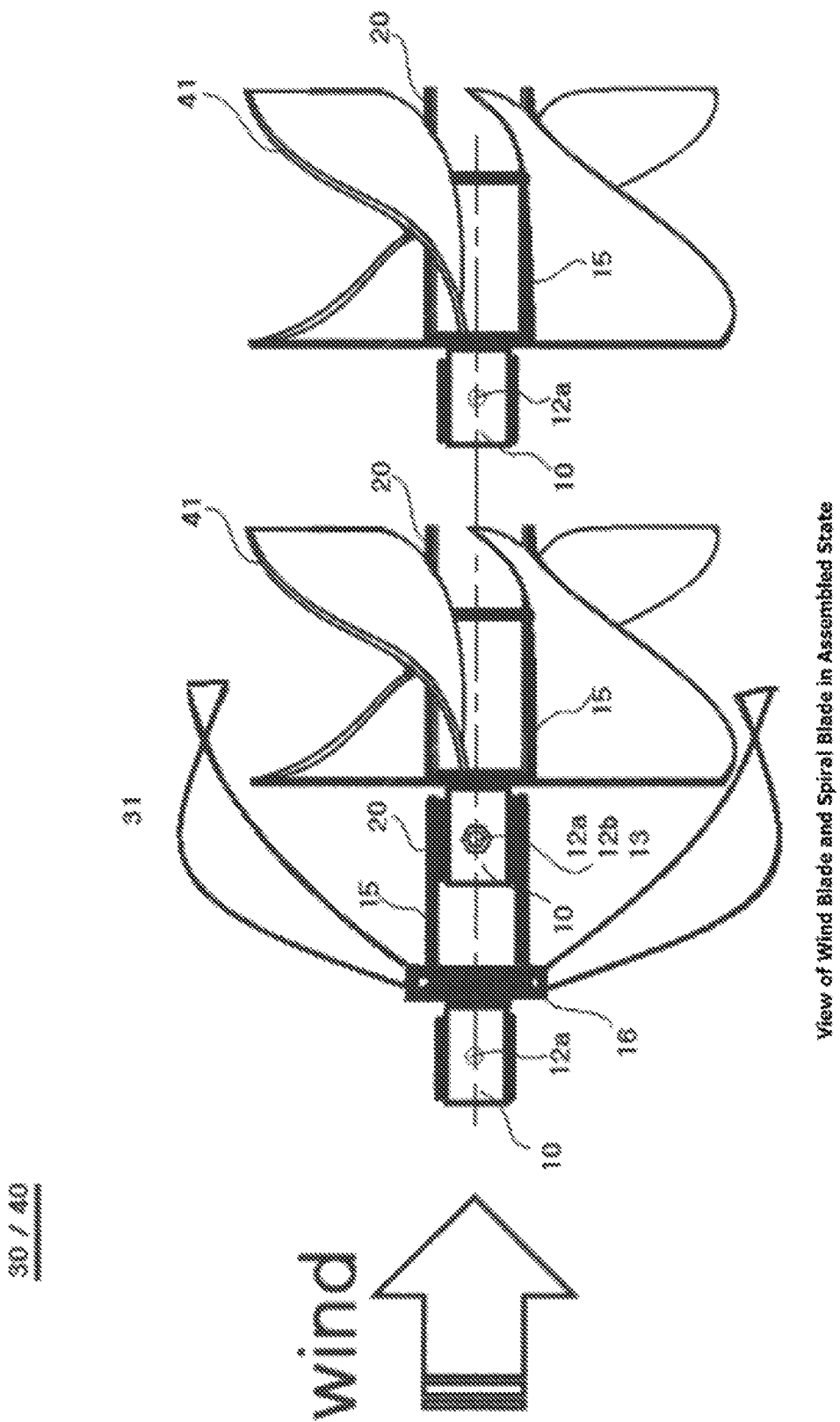
FIG. 5 illustrates a cross section view showing some parts of the wind guide and the blade which are coupled to each other.
Figure 6:
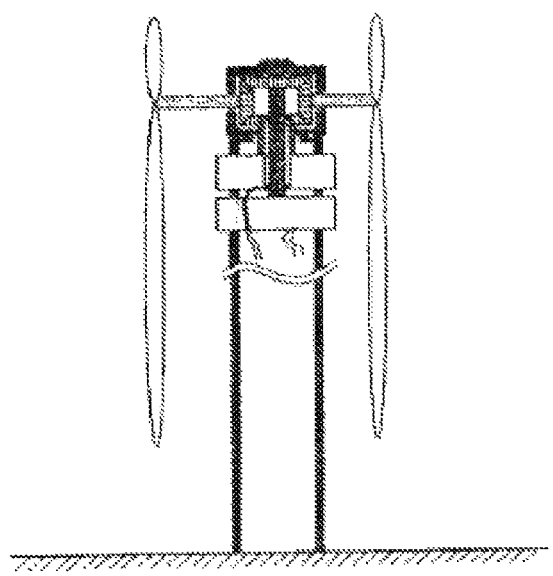
FIG. 6 illustrates a view showing a horizontal-axis wind power turbine generator of a new structure and a driving method thereof.

FIG. 5 illustrates a cross section view showing some parts of the wind guide and the blade which are coupled to each other.

Referring to FIG. 5, the wind guide 30 has the wind control blade 31 coupled to the outer circumference of the hollow cylinder pipe 15, and has the plug 10 coupled to the front side of the hollow cylinder pipe 15 and the socket 20 coupled to the rear side of the hollow cylinder pipe 15.

The rear socket 20 of the wind guide 30 is coupled to the front plug 10 of the spiral blade 40, and the rear socket 20 of the spiral blade 40 is coupled to the front plug 10 of the second spiral blade 40 which is the same as the prior spiral blade 40. In this way, as many spiral blades as intended are coupled to one another in series by adjusting an insertion angle.

Accordingly, the plug 10 is coupled to the front surface of the wind guide 30 and the spiral blade 40 and the socket 20 is coupled to the rear surface thereof.

As described above, detailed embodiments have been described in the detailed description of the present invention, but various changes can be made without departing from the scope of the present invention. Therefore, the present invention should not be understood as being limited to the above-described embodiments and the scope of the present invention should be understood as being defined by the appended claims and equivalents thereto.

1: horizontal-axis wind power turbine device
100: ground structure 20: socket
200: yawing device 21: protrusion connection recess
300: power generator 30: wind guide
400 accelerator 31: wind control blade
450: nacelle 32: 20° wind control blade lateral curved surface gradient angle
500: wind power turbine unit 33: 30° wind control blade longitudinal spiral twist angle
10: plug 34: 180° wind control blade alignment angle
11: concavo-convex protrusion 35: 15° wind control blade rear gradient angle
12a: screwing hole 40: spiral blade
12b: screwing hole 41: turbine blade
13: screw 42: 30° turbine blade lateral curved surface gradient angle
15: hollow cylinder pipe 43: 40° turbine blade longitudinal spiral twist angle
16: unit bearing 44: 120° turbine blade alignment angle

INDUSTRIAL APPLICABILITY

The present invention can be used in a wind power generator.

What is claimed is:

1. A horizontal-axis wind power turbine device for producing power, comprising:
a nacelle coupled to a power generator, an accelerator, and a unit bearing, wherein the unit bearing is coupled to a side surface of the nacelle;
a wind power turbine unit for producing power energy, the wind power turbine unit comprising:
a wind guide including a hollow cylinder pipe having a cylindrical shape, a plug having a cylindrical shape coupled to a first end of the hollow cylinder pipe of the wind guide, and a socket having a hollow formed therein coupled to a second end of the hollow cylinder pipe of the wind guide, the hollow cylinder pipe of the wind guide including an outer circumference, wherein the outer circumference of the hollow cylinder pipe of the wind guide is coupled to an inner circumference of the unit bearing, wherein the wind guide is provided with a plurality of wind control blades formed by bending plate structures in a streamlined shape in a leftward or rightward direction, wherein each wind control blade forms a 20° wind control blade lateral curved surface gradient angle, a 30° wind control blade longitudinal spiral twist angle, a 180° wind control blade alignment angle, and a 15° wind control blade rear gradient angle; and
a spiral blade including a hollow cylinder pipe having a cylindrical shape, a plug having a cylindrical shape coupled to a first end of the hollow cylinder pipe of the spiral blade, and a socket coupled to a second end of the hollow cylinder pipe of the spiral blade, wherein the plug of the spiral blade is inserted into the hollow of the socket of the wind guide, wherein the spiral blade is provided with a plurality of identical turbine blades formed by bending plate structures in a spiral pattern in the leftward or rightward direction, each of the plurality of turbine blades attached to an outer circumference of the hollow cylinder pipe of the spiral blade in a clockwise direction or a counter-clockwise direction.

2. The horizontal-axis wind power turbine device of claim 1, wherein the plug of the wind guide and the plug of the spiral blade are each formed in a hollow cylindrical shape, and each comprise: a plurality of protrusions formed on an outer circumference of each plug, wherein each of the plurality of protrusions extend in a longitudinal direction at a predetermined angle; and a screwing hole formed on the hollow cylindrical shape of each plug.

3. The horizontal-axis wind power turbine device of claim 1, wherein the socket of the wind guide and the socket of the spiral blade are each formed in a hollow cylindrical shape, and each comprise: a plurality of protrusion connection recesses formed on an inner circumference of each socket at a predetermined angle; and a screwing hole formed on the hollow cylindrical shape of each socket.

4. The horizontal-axis wind power turbine device of claim 1, wherein the hollow cylinder pipe of the wind guide and the hollow cylinder pipe of the spiral blade are coupled in series and function as a rotary shaft to transmit power to the accelerator.

* * * * *